(12) United States Patent
Fujimoto et al.

(10) Patent No.: US 8,671,906 B2
(45) Date of Patent: Mar. 18, 2014

(54) CLUTCH ACTUATOR MOUNTING STRUCTURE FOR INTERNAL COMBUSTION ENGINE

(75) Inventors: Yasushi Fujimoto, Wako (JP); Kinya Mizuno, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 13/042,952

(22) Filed: Mar. 8, 2011

(65) Prior Publication Data

US 2011/0220057 A1   Sep. 15, 2011

(30) Foreign Application Priority Data

Mar. 11, 2010   (JP) .................................. 2010-053925

(51) Int. Cl.
*F02B 75/32*   (2006.01)

(52) U.S. Cl.
USPC ...................................... 123/197.5; 192/112

(58) Field of Classification Search
USPC ...... 123/195 C, 196 R, 196 CP, 198 E, 197.5; 180/292, 312, 313; 192/112, 48.061, 192/48.064, 84.6

See application file for complete search history.

(56) References Cited

U.S. PATENT DOCUMENTS

| | | | | |
|---|---|---|---|---|
| 4,650,055 A | * | 3/1987 | Ooka | 192/85.5 |
| 6,443,275 B1 | * | 9/2002 | Hori et al. | 192/3.33 |
| 7,478,717 B2 | * | 1/2009 | Kunikiyo et al. | 192/83 |
| 2007/0144285 A1 | * | 6/2007 | Mochizuki et al. | 74/329 |
| 2007/0199755 A1 | * | 8/2007 | Takeuchi | 180/221 |
| 2008/0099306 A1 | * | 5/2008 | Tsukada et al. | 192/82 R |
| 2008/0128239 A1 | * | 6/2008 | Ogasawara | 192/85 R |

FOREIGN PATENT DOCUMENTS

| | | |
|---|---|---|
| DE | 202006019190 U1 | 4/2008 |
| EP | 0389957 A1 | 10/1990 |
| EP | 1696147 A1 | 8/2006 |
| EP | 1998063 A2 | 12/2008 |
| JP | 2008-138541 A | 6/2008 |
| WO | 2008/071185 A2 | 6/2008 |

\* cited by examiner

*Primary Examiner* — Hung Q Nguyen
(74) *Attorney, Agent, or Firm* — Westerman, Hattori, Daniels & Adrian, LLP

(57) ABSTRACT

A clutch actuator mounting structure for internal combustion engine has excellent maintainability such that clutch actuator maintenance and the like can be carried out without dismounting an engine case. The clutch actuator mounting structure for an internal combustion engine includes, in the engine case, a power transmission mechanism designed to transmit rotational power of a crankshaft to an output shaft through a shift clutch and a transmission. The engine case is formed with a clutch actuator containing part in which a clutch actuator for engaging/disengaging the shift clutch is contained. The clutch actuator containing part has a clutch actuator mounting/dismounting port through which to mount and dismount the clutch actuator. The clutch actuator mounting/dismounting port is formed to be exposed to the exterior.

11 Claims, 14 Drawing Sheets

CLUTCH ACTUATOR MOUNTING STRUCTURE FOR INTERNAL COMBUSTION ENGINE

TECHNICAL FIELD

A structure for mounting a clutch actuator for engaging and disengaging a shift clutch of an internal combustion engine is disclosed.

BACKGROUND OF THE INVENTION

An internal combustion engine with such a clutch actuator mounted to an engine case is disclosed in Japanese Patent Laid-open No. 2008-138541.

In the internal combustion engine disclosed in Japanese Patent Laid-open No. 2008-138541, which is equipped with a twin clutch type transmission, a twin clutch operated by oil pressure is provided at an end portion of a main shaft of the transmission, and a clutch cover mounted to a right side surface of a crankcase is projected to the right side to cover the twin clutch.

In addition, along a mating surface of the crankcase for mating with the clutch cover, the crankcase is provided at its inner surface with a clutch actuator containing part bulged to the inner side. Further, a clutch actuator for engaging and disengaging the twin clutch is inserted into the clutch actuator containing part through an opening formed in that surface of the clutch actuator containing part which is the same as the mating surface, and the clutch actuator is detachably mounted.

In the manner of extending from the clutch actuator containing part of the crankcase, a control oil passage for supplying a working oil to the shift clutch is formed in communication with the inside of a side wall of the crankcase and the inside of a side wall of the clutch cover.

SUMMARY OF THE INVENTION

As above-mentioned, the structure for mounting the clutch actuator disclosed in Japanese Patent Laid-open No. 2008-138541 is disposed on the inner side of the crankcase and the clutch cover. Therefore, for performing clutch actuator maintenance or the like, the clutch cover which is formed with the control oil passage and large in size must be dismounted, and workability is poor accordingly.

A clutch actuator mounting structure for internal combustion engine is provided which has excellent maintainability such that clutch actuator maintenance and the like can be carried out without dismounting an engine case.

In a first aspect, there is provided a clutch actuator mounting structure for an internal combustion engine including, in an engine case, a power transmission mechanism designed to transmit rotational power of a crankshaft to an output shaft through a shift clutch and a transmission, characterized in that the engine case is formed with a clutch actuator containing part in which a clutch actuator for engaging/disengaging the shift clutch is contained; and the clutch actuator containing part has a clutch actuator mounting/dismounting port through which to mount and dismount the clutch actuator, the clutch actuator mounting/dismounting port being formed to be exposed to the exterior.

In a second aspect, the engine case formed with the clutch actuator containing part is a case cover for covering the shift clutch on a lateral side of a crankcase for rotatably supporting the crankshaft thereon, and the clutch actuator containing part is formed to project to a lateral side of the case cover.

In a third aspect, the internal combustion engine is mounted on a vehicle with the crankshaft oriented in a left-right direction; the shift clutch is provided at that shaft end of a main shaft in the transmission provided inside the crankcase which is projected into the inside of the case cover; the case cover has a bulge containing part in which a gear pair for transmitting power from the crankshaft to the shift clutch and the shift clutch are contained, the bulge containing part being bulged to a lateral side; and the case cover has the clutch actuator containing part projected into a space on the lower side of the bulge containing part.

In a fourth aspect, the case cover is provided with an oil filter so as to overlap, in front view, with the front side of the clutch actuator containing part in the space on the lower side of the bulge containing part of the case cover.

In a fifth aspect, the oil filter has an oil filter housing in which to contain a filter element, the oil filter housing being projectingly formed as part of the case cover.

In a sixth aspect, the clutch actuator containing part is formed on the inner side relative to an outside part of the oil filter housing in a vehicle body width direction.

In a seventh aspect, the clutch actuator containing part is formed to have its longitudinal direction oriented in a front-rear direction, and the oil filter housing is formed in such a shape that a filter element being cylindrical in shape is contained in the oil filter housing with the center axis of the cylinder oriented in the front-rear direction.

In an eighth aspect, the clutch actuator containing part is formed with the clutch actuator mounting/dismounting port oriented rearward; and the oil filter housing is formed with a filter element mounting/dismounting port through which to mount and dismount the filter element, the filter element mounting/dismounting port being oriented forward.

In a ninth aspect, the clutch actuator containing part is formed at a vertical position such that its lower end is proximate to or in contact with a lower end edge of the case cover, and the oil filter housing has its upper end located at substantially the same vertical position as an upper end of the clutch actuator containing part.

In a tenth aspect, the shift clutch is a twin clutch; the two clutch actuators for respectively driving clutches of the twin clutch by oil pressure are provided on a front lower side of the twin clutch; and a pair of control oil passages for supplying a working oil from the clutch actuators to the corresponding shift clutches respectively are formed at an outside surface of the case cover in the state of being oriented obliquely and extending rectilinearly in parallel to each other.

In an eleventh aspect, a first control oil pressure sensor is upwardly projectingly provided at a substantially central position of a first control oil passage which is an upper-side one of the pair of control oil passages oriented obliquely; and a second control oil pressure sensor is rearwardly projectingly provided in a second control oil passage which is a lower-side one of the pair of control oil passages, at a height position between the shift clutch and the clutch actuators.

In a twelfth aspect, a discharged oil from an oil pump is led into the oil filter; and a discharge oil pressure sensor for detecting the oil pressure of the discharged oil is forwardly projectingly provided on the oil filter.

In a thirteenth aspect, the discharge oil pressure sensor is mounted to a filter cover member for closing the filter element mounting/dismounting port, which is oriented forward, of the oil filter housing of the oil filter.

According to the clutch actuator mounting structure for the internal combustion engine of the first aspect, the clutch actuator containing part formed as part of the engine case has the clutch actuator mounting/dismounting port formed to be exposed to the exterior. This ensures that the clutch actuator contained in the clutch actuator containing part can be put in and out through the clutch actuator mounting/dismounting port without dismounting the engine case, and maintainability is extremely good accordingly.

According to the clutch actuator mounting structure for the internal combustion engine of the second aspect, the case cover for covering the shift clutch has the clutch actuator containing part formed to project to a lateral side, and the clutch actuator mounting/dismounting port formed as part of the clutch actuator containing part is exposed to the exterior. Therefore, the clutch actuator can be put in and out through the clutch actuator mounting/dismounting port of the case cover without dismounting the case cover, and maintainability is extremely good accordingly.

In this structure, the clutch actuator containing part formed to project to a lateral side of the case cover is formed with the clutch actuator mounting/dismounting port exposed to the exterior, so that the clutch actuator mounting structure can be simplified.

According to the clutch actuator mounting structure for the internal combustion engine of the third aspect, the clutch actuator containing part is projectingly formed by utilizing the space on the lower side of that bulge containing part of the case cover in which the gear pair for transmitting power from the crankshaft to the shift clutch at an end portion of the main shaft and the shift clutch are contained and which is formed to be bulged to a lateral side. This ensures that the clutch actuator containing part can be formed without enlarging the internal combustion engine in overall left-right width or overall front-rear width, and it is therefore possible to obviate an enlargement of the size of the internal combustion engine.

According to the clutch actuator mounting structure for the internal combustion engine of the fourth aspect, the case cover is provided with the oil filter so as to overlap, in front view, with the front side of the clutch actuator containing part in the space on the lower side of the bulge containing part of the case cover. This ensures that the clutch actuator containing part is provided on the rear side while the oil filter is provided on the front side, in the space on the lower side of the bulge containing part of the case cover. Therefore, the oil filter can be provided without enlarging the internal combustion engine in overall left-right width or overall front-rear width. Consequently, it is possible to obviate an enlargement of the size of the internal combustion engine.

According to the clutch actuator mounting structure for the internal combustion engine of the fifth aspect, the oil filter has the oil filter housing in which to contain the filter element, the oil filter housing being projectingly formed as part of the case cover. Thus, the oil filter housing is not formed separately from the case cover but formed integrally with the case cover, which leads to a reduction in the number of component parts and to enhanced maintainability.

According to the clutch actuator mounting structure for the internal combustion engine of the sixth aspect, the clutch actuator containing part is formed on the inner side relative to the outside part of the oil filter housing in the vehicle body width direction. Therefore, the oil filter housing serves as a shield by which the clutch actuator can be protected from flying stones and the like.

According to the clutch actuator mounting structure for the internal combustion engine of the seventh aspect, the clutch actuator containing part is formed to have its longitudinal direction oriented in the front-rear direction, and the oil filter housing is formed in such a shape that the filter element being cylindrical in shape is contained in the oil filter housing with the center axis of the cylinder oriented in the front-rear direction. This ensures that both the oil filter housing and the clutch actuator containing part formed in the space on the lower side of the bulge containing part of the case cover can be made small in vertical width and left-right width, so that the internal combustion engine as a whole is not enlarged in vertical width or left-right width. In addition, with the clutch actuator containing part and the oil filter housing set proximate to each other, it is possible to obviate an enlargement of the size of the internal combustion engine.

According to the clutch actuator mounting structure for the internal combustion engine of the eighth aspect, the clutch actuator containing part is formed with the clutch actuator mounting/dismounting port oriented rearward, and the oil filter housing is formed with a filter element mounting/dismounting port through which to mount and dismount the filter element, the filter element mounting/dismounting port being oriented forward. This makes it possible to mount and dismount the clutch actuators and the filter element without interference between the clutch actuator containing part and the oil filter housing which are laid out proximate to each other. Consequently, easy maintenance can be achieved.

According to the clutch actuator mounting structure for the internal combustion engine of the ninth aspect, the clutch actuator containing part is formed at a vertical position such that its lower end is proximate to or in contact with the lower end edge of the case cover. This ensures that a lowering of the center of gravity can be contrived by lowering the clutch actuator containing part as much as possible. In addition, the oil filter housing has its upper end located at substantially the same vertical position as the upper end of the clutch actuator containing part. This enables effective utilization of the space on the upper side of the clutch actuator containing part and the oil filter housing which have their upper ends at substantially the same vertical position.

According to the clutch actuator mounting structure for the internal combustion engine of the tenth aspect, the two clutch actuators for respectively driving clutches of the twin clutch by oil pressure are provided on the front lower side of the twin clutch, and the pair of control oil passages for supplying the working oil from the clutch actuators to the corresponding shift clutches respectively are formed at the outside surface of the right case cover in the state of being oriented obliquely and extending rectilinearly in parallel to each other. Therefore, on the rear side of the clutch actuators and on the lower side of the twin clutch, where the pair of control oil passages do not interfere, a space which is opened on the rear side and the lower side and the outer side and which is suitable for putting the driver's foot can be secured near the case cover.

According to the clutch actuator mounting structure for the internal combustion engine of the eleventh aspect, the first control oil pressure sensor is upwardly projectingly provided at the substantially central position of the first control oil passage which is the upper-side one of the pair of control oil passages oriented obliquely, and the second control oil pressure sensor is rearwardly projectingly provided at the second control oil passage which is the lower-side one of the pair of control oil passages, at a height position between the shift clutch and the clutch actuators. This ensures that the first control oil pressure sensor and the second control oil pressure sensor which enhance performance of control of the shift clutch can be provided in a compact fashion while avoiding interference with other component parts.

According to the clutch actuator mounting structure for the internal combustion engine of the twelfth aspect, the oil discharged from the oil pump is led into the oil filter, and the discharge oil pressure sensor for detecting the oil pressure of the discharged oil is forwardly projectingly provided on the oil filter. This ensures that the discharge oil pressure sensor can be provided while utilizing the space on the front side of the oil filter and while obviating, as securely as possible, the projection of the discharge oil pressure sensor from the internal combustion engine.

According to the clutch actuator mounting structure for the internal combustion engine of the thirteenth aspect, the discharge oil pressure sensor is mounted to the filter cover member for closing the filter element mounting/dismounting port, which is oriented forward, of the oil filter housing of the oil filter. Therefore, by preliminarily mounting the discharge oil pressure sensor to the filter cover member (87) and handling them as one body, it is possible to enhance workability.

BRIEF DESCRIPTION OF THE DRAWINGS

The advantages of the invention will become apparent in the following description taken in conjunction with the drawings, wherein.

DETAILED DESCRIPTION OF THE INVENTION

Now, an embodiment will be described below, based on FIGS. 1 to 17.

Figure 1:
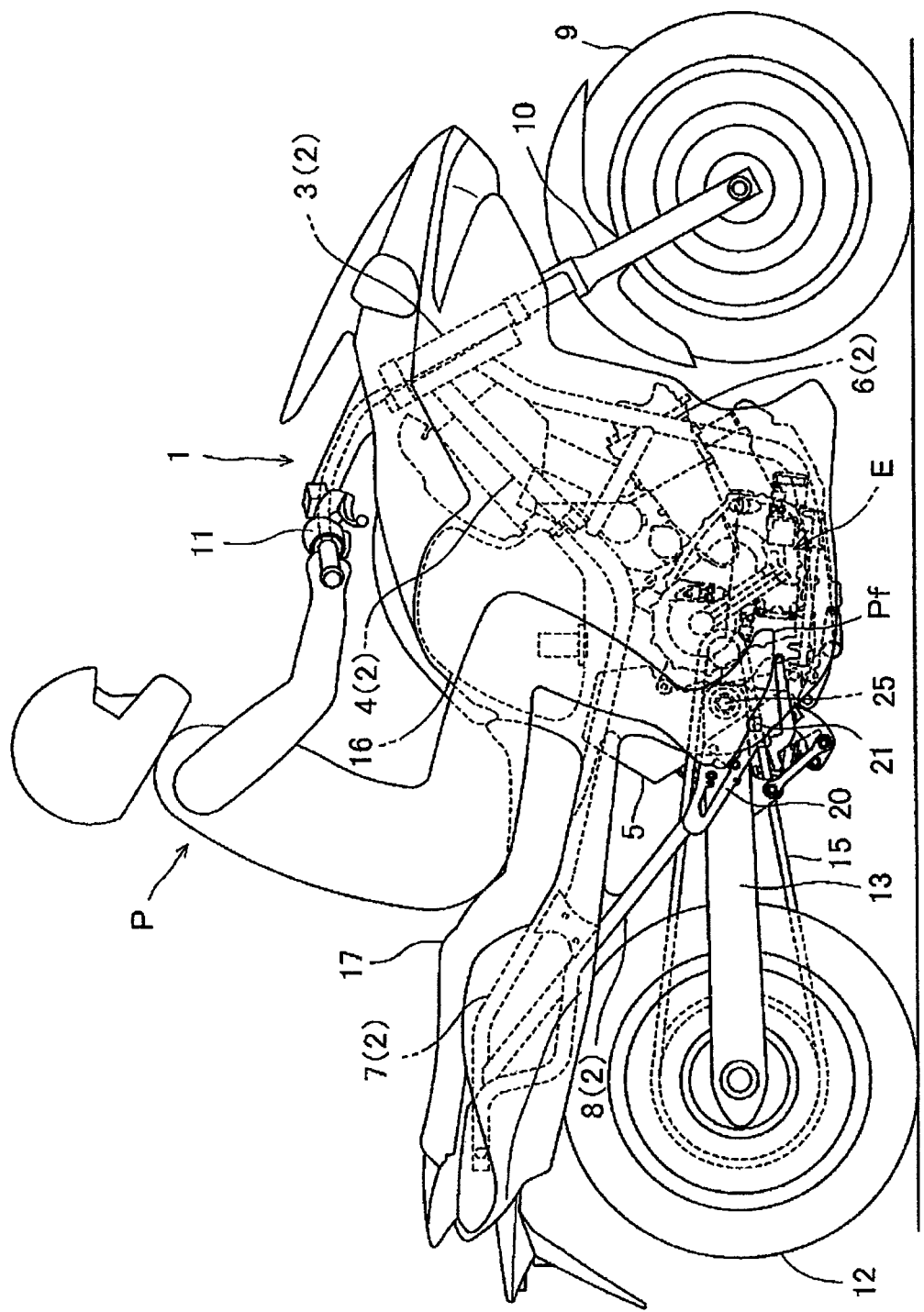
FIG. 1 is a right side view of a motorcycle on which an internal combustion engine is mounted.

FIG. 1 is a right side view of a motorcycle 130 on which an internal combustion engine according to this embodiment is mounted.

In FIG. 1, a body frame 2 of the motorcycle 1 includes a head pipe 3, main frames 4 extending obliquely rearward from the head pipe 3, a center frame 5 extending downward from the rear ends of the main frames 4, a down frame 6 extending downward from the head pipe 3, seat stays 7 extending rearward from an upper portion of the center frame 5, and a mid frame 8 bridgingly interposed between a rear portion of the center frame 5 and rear portions of the seat stays 7.

A front fork 10 supporting a front wheel 9 thereon is steerably supported on the head pipe 3, and a steering handle 11 is connected to an upper portion of the front fork 10.

In addition, a rear fork 13 supporting a rear wheel 12 thereon is vertically swingably supported through a pivot bolt 25 of the center frame 5.

An internal combustion engine E is, for example, a 2-cylinder, 4-stroke internal combustion engine, and is supported by the main frame 4, the center frame 5 and the down frame 6.

Rotational power of an output shaft of the internal combustion engine E is transmitted to the rear wheel 12 through a rear wheel driving chain 15.

A fuel tank 16 is mounted between the left and right main frames 4, and a tandem type seat 17 on which a driver P and a pillion passenger can be seated is mounted on the left and right seat stays 7 on the rear side of the fuel tank 16.

As shown in FIG. 1, on a right side surface of a vehicle body, a step holder 20 is provided at a joint between a lower portion of the center frame 5 and the mid frame 8, and a foot step 21 is projectingly provided on the step holder 20.

On a left side surface of the vehicle body, also, a foot step 21 is provided at a position in left-right symmetry with the position of the above-mentioned foot step 2.

The internal combustion engine E is mounted in a horizontal posture on the body frame 2, with its crankshaft 30 oriented in the left-right direction, which is the vehicle body width direction. The crankshaft 30 is rotatably supported between an upper crankcase 31U and a lower crankcase 31L into which a crankcase is bisected, with bearings therebetween.

Figure 2:
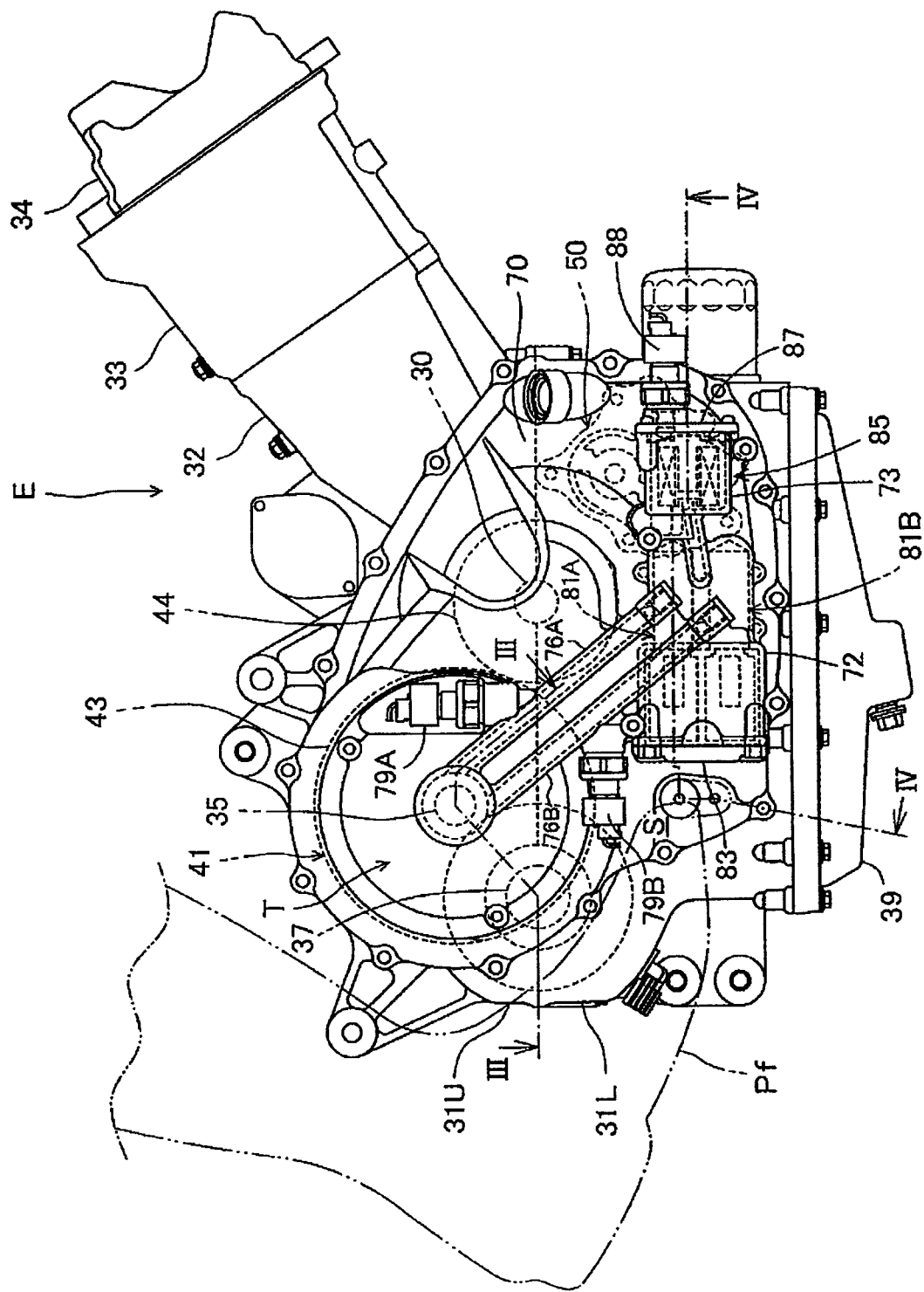
FIG. 2 is a right side view of the internal combustion engine.

Referring to FIG. 2, a cylinder block 32, a cylinder head 33 and a cylinder head cover 34 which are sequentially stacked and slanted to the front side are provided in such a manner as to project along a forwardly upward direction from the upper crankcase 31U.

The lower side of the lower crankcase 31L is closed with an oil pan 39.

A main shaft 35 of a transmission T is rotatably borne on the upper crankcase 31U at a slightly obliquely upper position on the rear side of the crankshaft 30 and in parallel to the crankshaft 30, through bearings 36, 36 therebetween. At an obliquely lower position on the rear side of the main shaft 35, a counter shaft 37 as an output shaft is rotatably borne between the upper crankcase 31U and the lower crankcase 31L, through bearings 38, 38 therebetween (see FIGS. 2 and 3).

Figure 3:
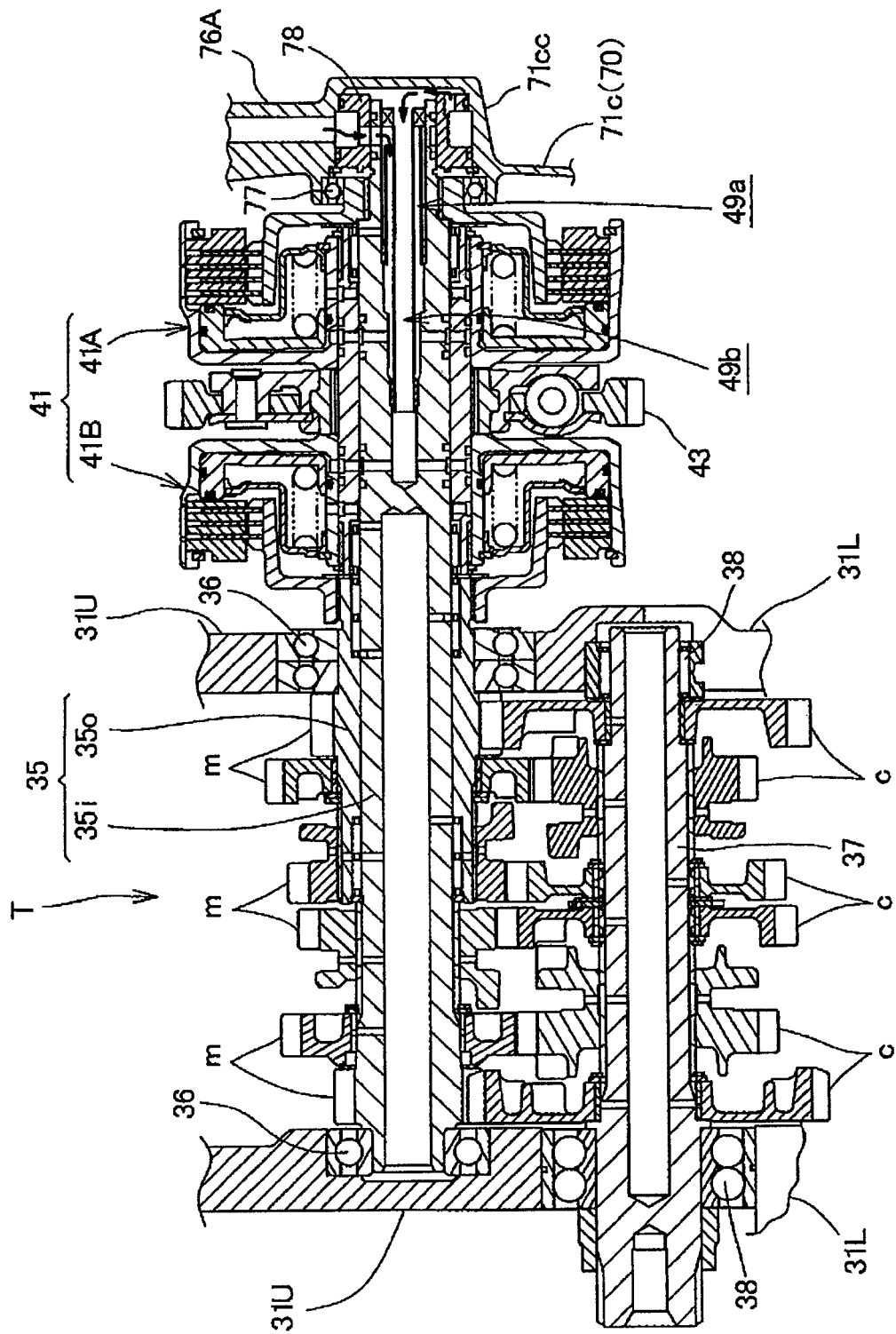
FIG. 3 is a sectional view taken along line III-III of FIG. 2.

Referring to FIG. 3, the main shaft 35 of the transmission T has a structure wherein a main outer shaft 35*o* is fitted over a main inner shaft 35*i* so as to be capable of relative rotation, and the main shafts are provided respectively with pluralities of drive gears m. A plurality of driven gears c provided on the counter shaft 37 and the corresponding drive gears m are normally meshed with each other.

The main outer shaft 35*o* and the main inner shaft 35*i* rightwardly penetrating the bearing 36 fitted to a right side wall of the upper crankcase 31U are provided thereon with a twin clutch 41 composed of a pair of a first friction clutch 41A and a second friction clutch 41B. A primary driven gear 43 is fitted to clutch outers of both the clutches.

Engagement/disengagement of the first friction clutch 41A and the second friction clutch 41B is controlled respectively by oil pressures supplied through in-shaft oil passages 49*a* and 49*b* formed on the outer side and the inner side in the inside of the main shaft 35, whereby shifting of the transmission T is conducted.

A right case cover 70 is put on a right side surface of a crankcase obtained by uniting the upper crankcase 31U and the lower crankcase 31L.

The friction clutches 41A and 41B provided on the right side relative to the right side walls of the upper and lower crankcases 31U and 31L, the primary driven gear 43, a primary drive gear 44 fitted to the crankshaft 30 and meshed with the primary driven gear 43, etc. are covered by the right case cover 70.

In addition, a control oil pump 50 provided at a front portion of the right side wall of the lower crankcase 31L is also covered by the right case cover 70 (see FIG. 2).

Figure 4:
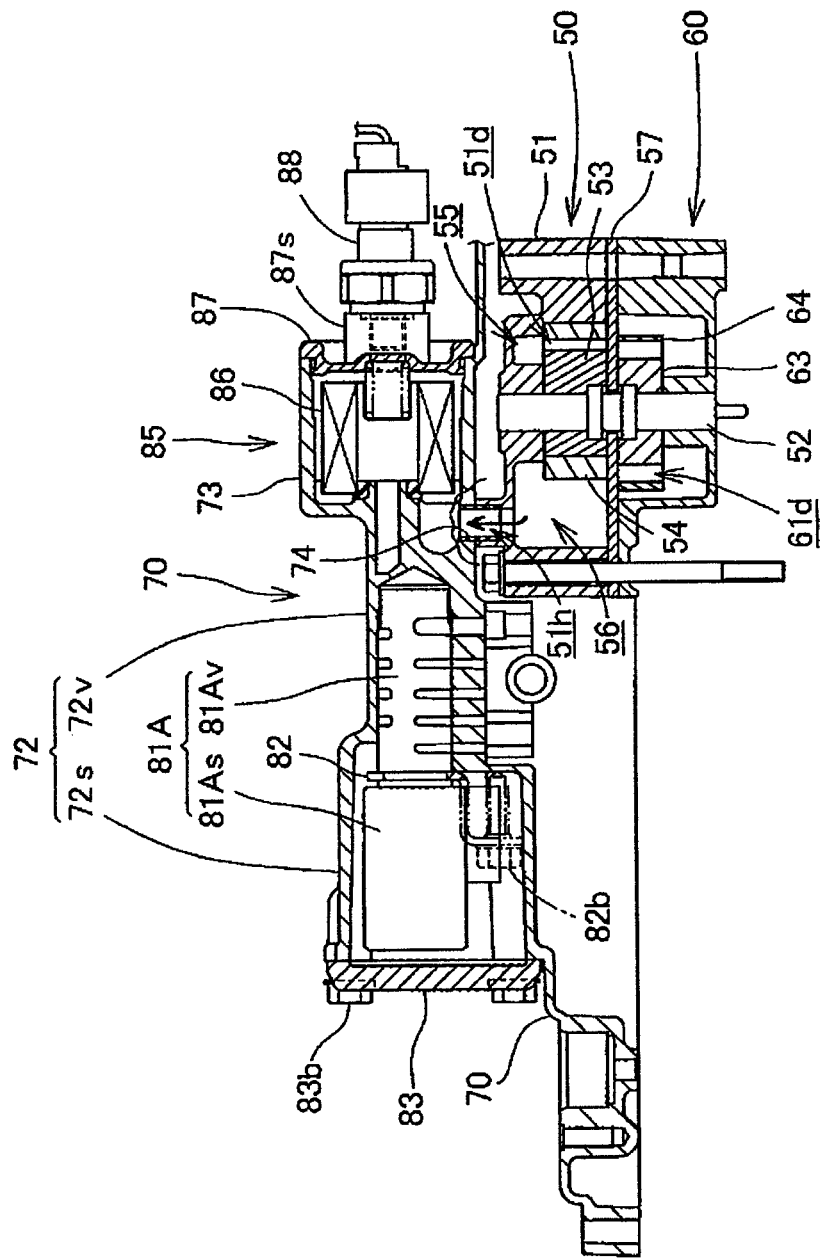
FIG. 4 is a sectional view taken along line IV-IV of FIG. 2.

Referring to FIG. 4, a control oil pump case 51 is formed with a circular recess 51d opened on the left side for containing therein an inner rotor 53 and an outer rotor 54 which are provided respectively on the inner and outer sides and are meshed with each other. The circular recess 51d is covered with a partition plate 57 brought into contact with the oil pump case 51 from the left side.

A lubricating oil pump 60 is provided on the left side of the partition plate 57, with a pump drive shaft 52 disposed in common for the lubricating oil pump 60 and the control oil pump 50.

The lubricating oil pump 60 is formed with a circular recess 61d opened on the right side for containing therein an inner rotor 63 and an outer rotor 64 which are provided respectively on the inner and outer sides and are meshed with each other. The circular recess 61d is covered with the partition plate 57 brought into contact with the lubricating oil pump case 61 from the right side.

In other words, the partition plate 57 is interposed between the control oil pump case 51 and the lubricating oil pump case 61, thereby partitioning the control oil pump 50 and the lubricating oil pump 60 from each other.

The pump drive shaft 52 provided in common for both the oil pumps 50 and 60 is rotatably borne, with both its ends borne on the control oil pump case 51 and the lubricating oil pump case 61 and with its center borne on the partition plate 57, while being oriented in the left-right direction.

Figure 16:
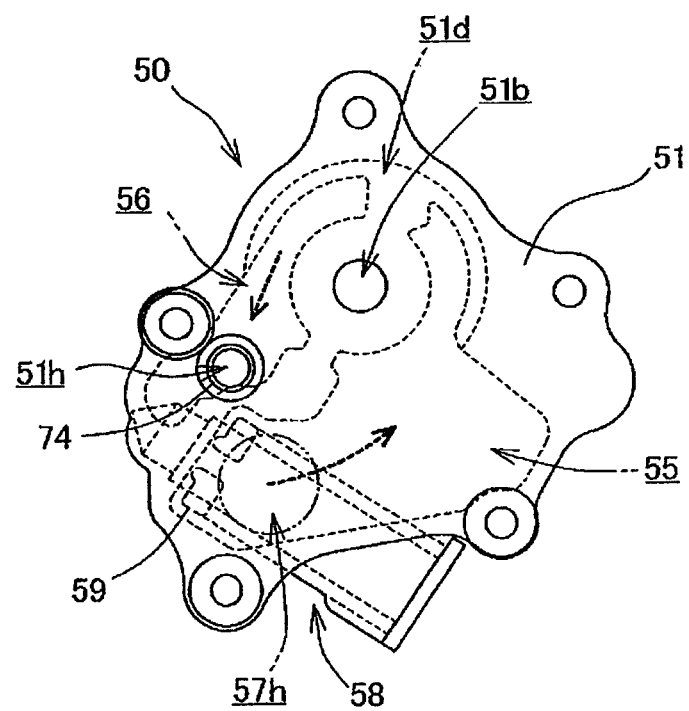
FIG. 16 is a right side view of a control oil pump.

Referring to FIG. 4 and to FIG. 16, which is a right side view of the control oil pump case 51, the circular recess 51d is formed in a mating surface of the control oil pump case 51 for mating with the partition plate 57, whereas a suction oil passage 55 dug to be deeper than the circular recess 51d is formed along a little less than half a circumference around the front side of a bearing circular hole 51b of the pump drive shaft 52 and is formed to further extend downward and expand largely to the front and rear sides.

On the other hand, a discharge oil passage 56 dug to be deeper than the circular recess 51d is formed along a little less than half a circumference around the rear side of the bearing circular hole 51b and is formed to further extent in a rearwardly downward direction toward the filter case 61.

The partition plate 57 brought into contact with the mating surface of the control oil pump case 51 has a circular suction port 57h bored correspondingly to that portion of the suction oil passage 55 which is expanded rearward. Though not shown, a suction pipe extending from an oil strainer disposed along a bottom surface of the oil pan 39 is connected to the suction port 57h.

The control oil pump case 51 is formed with a discharge port 51h opened in its portion on the rear side of the discharge oil passage 56 (see FIG. 16).

Therefore, when the control oil pump 50 is driven, an oil collecting in the oil pan 39 is sucked into the suction oil passage 55 through the oil strainer, and the discharged oil is passed through the discharge oil passage 56 to be led through the discharge port 51h to an oil filter which is provided at the right case cover 70, as will be described later.

Incidentally, in that portion of the suction oil passage 55 which is expanded rearward, a relief valve device 58 as an oil return mechanism is fitted in the state of being oriented in a direction orthogonal to the pump drive shaft 52. A valve element 59 of the relief valve device 58 fronts on the discharge oil passage 56. When the discharge oil pressure exceeds a predetermined pressure, a movement of the valve element 59 results in opening of the valve, whereby the discharge oil passage 56 and the suction oil passage 55 are made to communicate with each other, and a portion of the oil discharged into the discharge oil passage 56 is returned into the suction oil passage 55. Consequently, an adjustment is made so that the discharge oil pressure would not reach or exceeds a predetermined oil pressure.

The above-mentioned control oil pump 50 provided at a front portion of the right side wall of the lower crankcase 31L is covered with the right case cover 70 from the right side.

Now, the structure of the right case cover 70 will be described below, based mainly on FIGS. 7 to 11.

Figure 7:
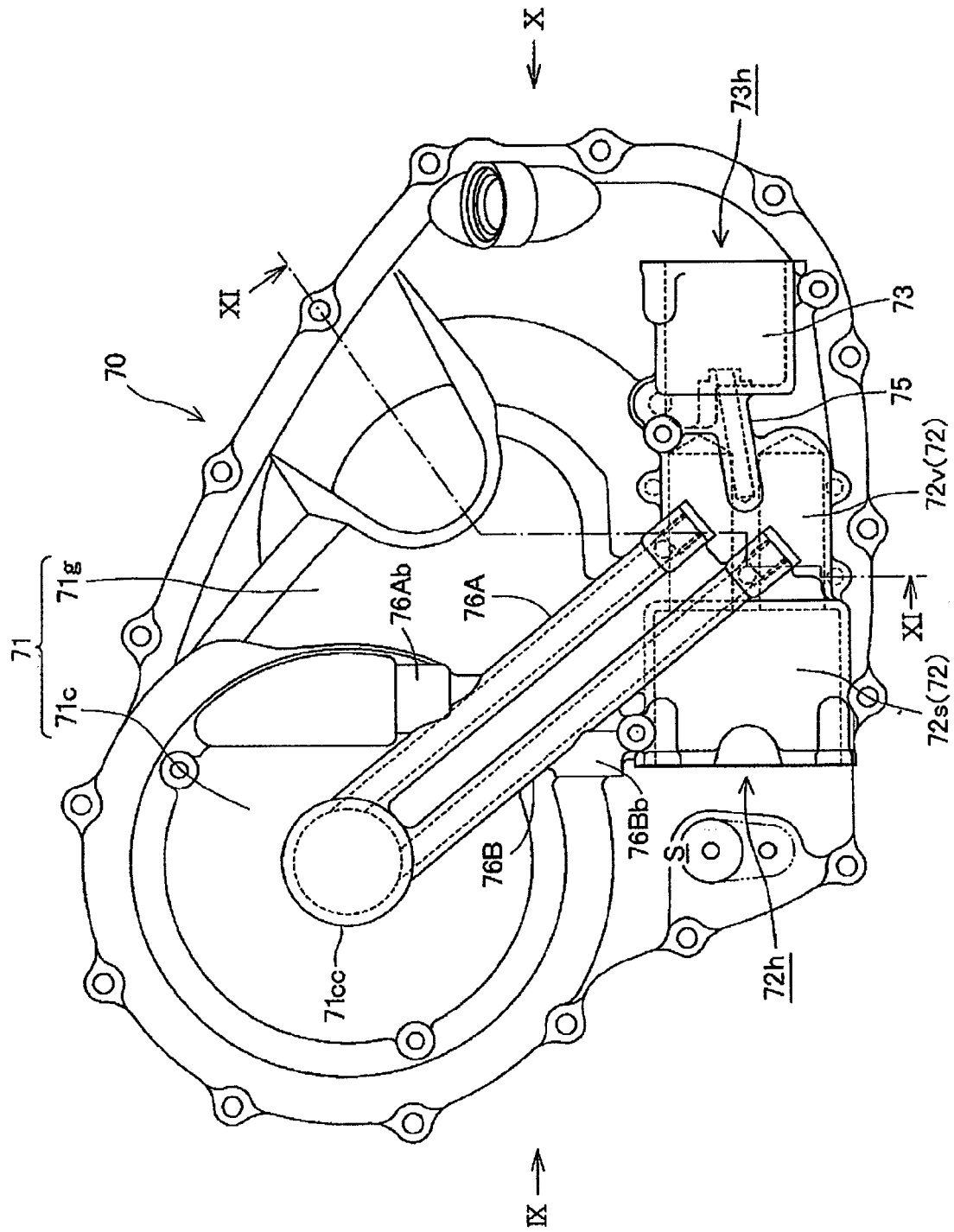
FIG. 7 is a right side view (outside view) of the right case cover.
Figure 8:
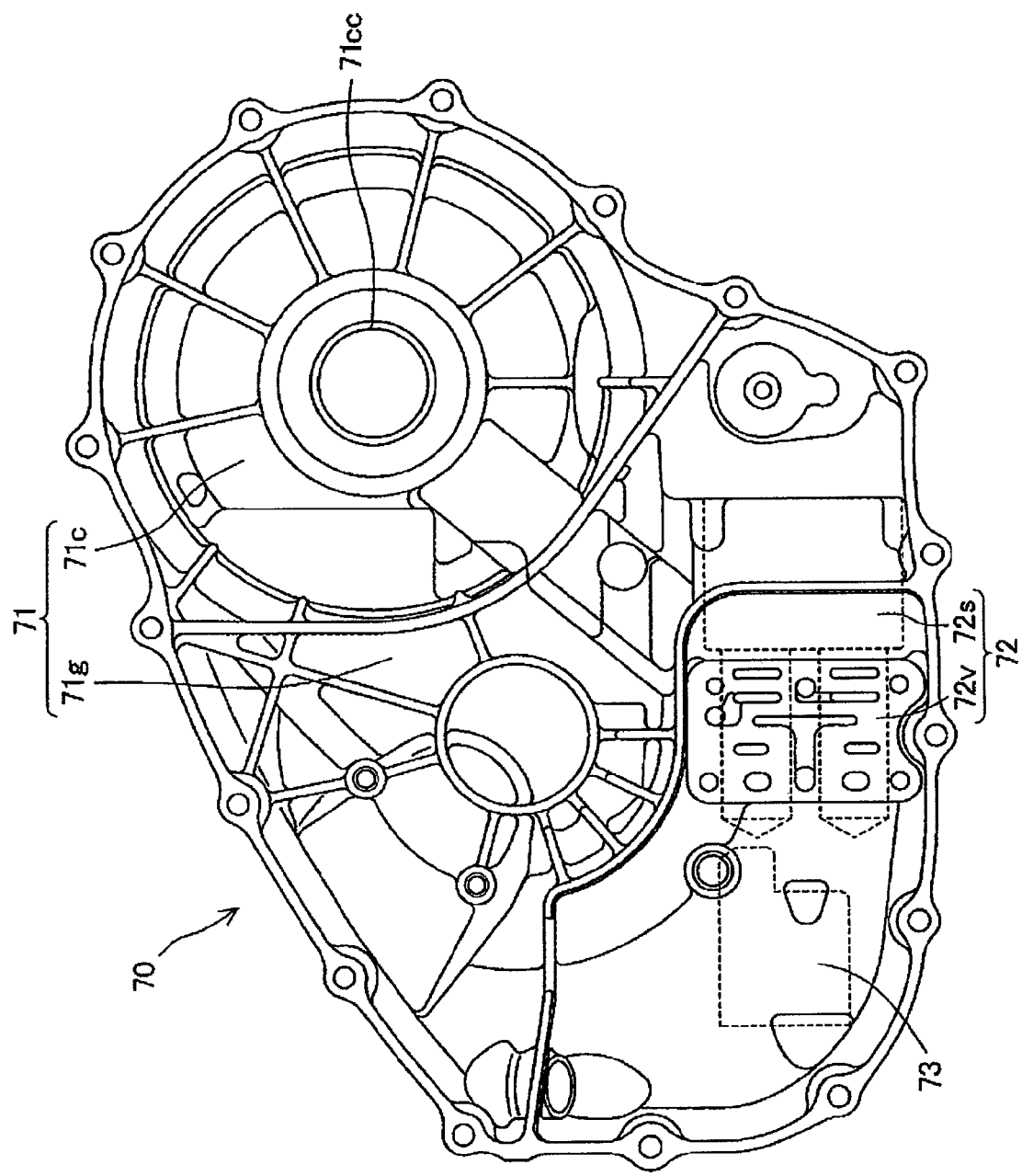
FIG. 8 is a left side view (inside view) of the right case cover.
Figure 9:
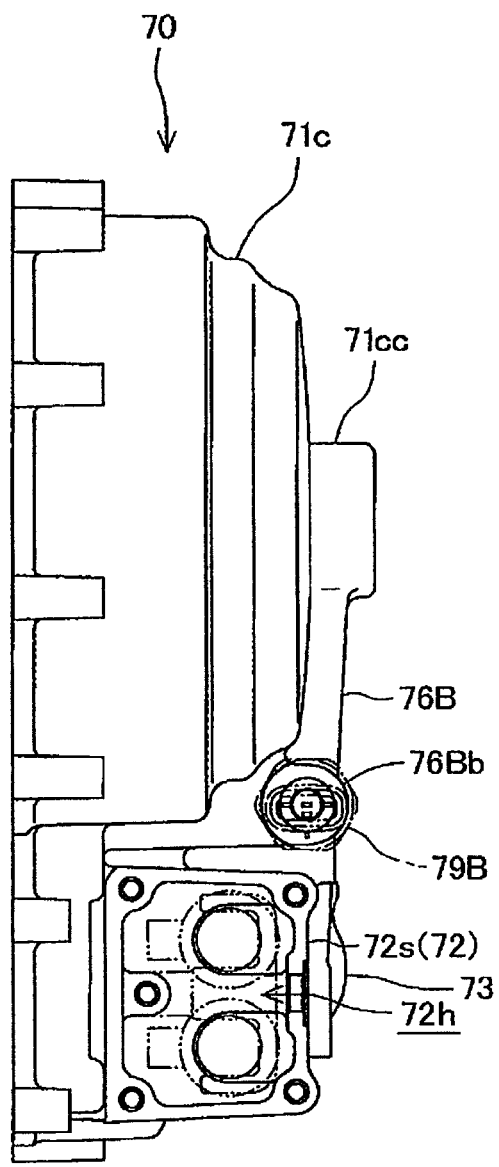
FIG. 9 is a rear view (view taken along arrow IX of FIG. 7) of the right case cover.
Figure 10:
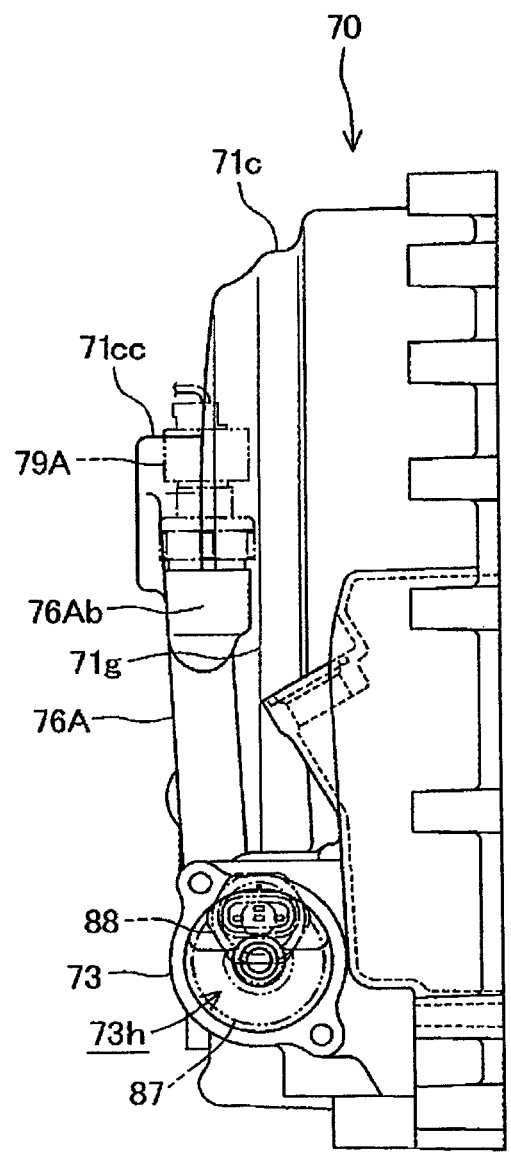
FIG. 10 is a front view (view taken along arrow X of FIG. 7) of the right case cover.
Figure 11:
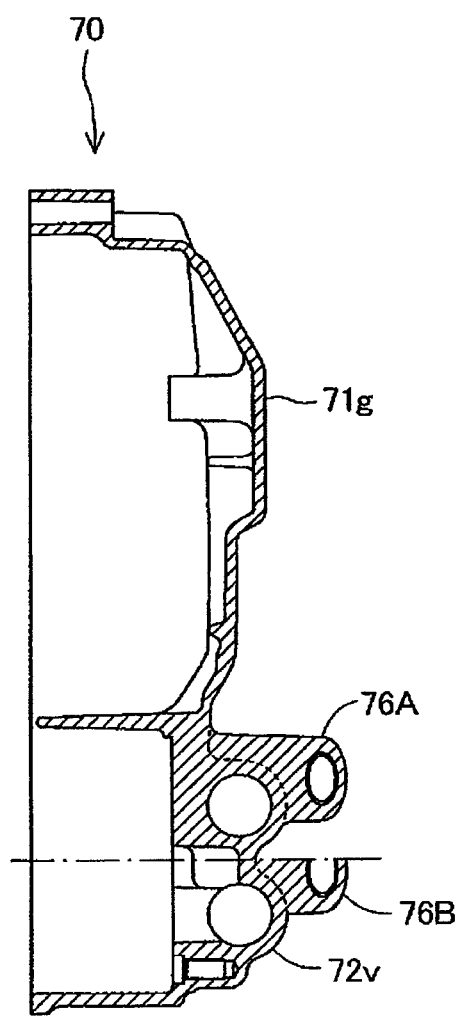
FIG. 11 is a sectional view (sectional view taken along line XI-XI of FIG. 7) of the right case cover.
Figure 12:
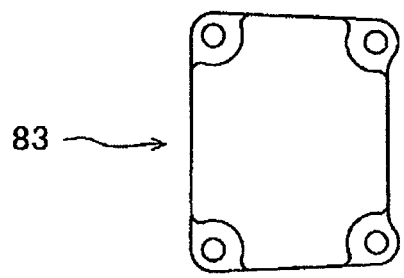
FIG. 12 is an outside view of a clutch actuator cover member.
Figure 13:
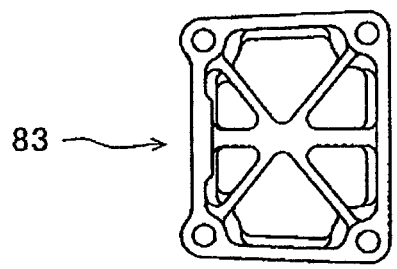
FIG. 13 is an inside view of the clutch actuator cover member.

A right side view of the right case cover 70 is shown in FIG. 7, a left side view of the same in FIG. 8, a rear view of the same in FIG. 9, a front view of the same in FIG. 10, and a sectional view (sectional view taken along line XI-XI of FIG. 7) of the same is shown in FIG. 11.

The right case cover 70 has a structure in which a roughly upper half portion of its side wall facing the right crankcase 31R is bulged rightward to form a bulge containing part 71, a rear half portion of the bulge containing part 71 is further bulged to form a clutch containing part 71c for containing the twin clutch 41, and a front half portion of the bulged containing part 71 forms a gear containing part 71g for containing a pair of the primary drive gear 44 and the primary driven gear 43 which are meshed with each other and transmit power from the crankshaft 30 to the twin clutch 41.

The right case cover 70 projects from a side wall into a space on the lower side of the bulge containing part 71 to form a clutch actuator containing part 72 for containing therein an upper-lower pair of a first clutch actuator 81A and a second clutch actuator 81B.

The clutch actuator containing part 72 has a rectangular tubular shape oriented in the front-rear direction, in which a valve case 72v is formed in a front half, and a solenoid case 72s is formed in a rear half.

The valve case 72v has a structure in which respective valve element driving parts 81Av and 81Bv of the first and second clutch actuators 81A and 81B are respectively inserted into circular holes which are bored on upper and lower sides while oriented in the front-rear direction and are closed at their front ends. The solenoid case 72s is provided at its rear end with a clutch actuator mounting/dismounting port 72h oriented rearward, opened in a vertically long rectangular shape and exposed to the exterior (see FIG. 9); respective linear solenoids 81As and 81Bs of the first and second clutch actuators 81A and 81B are inserted, while aligned on the upper and lower sides, in an internal common space.

Figure 5:
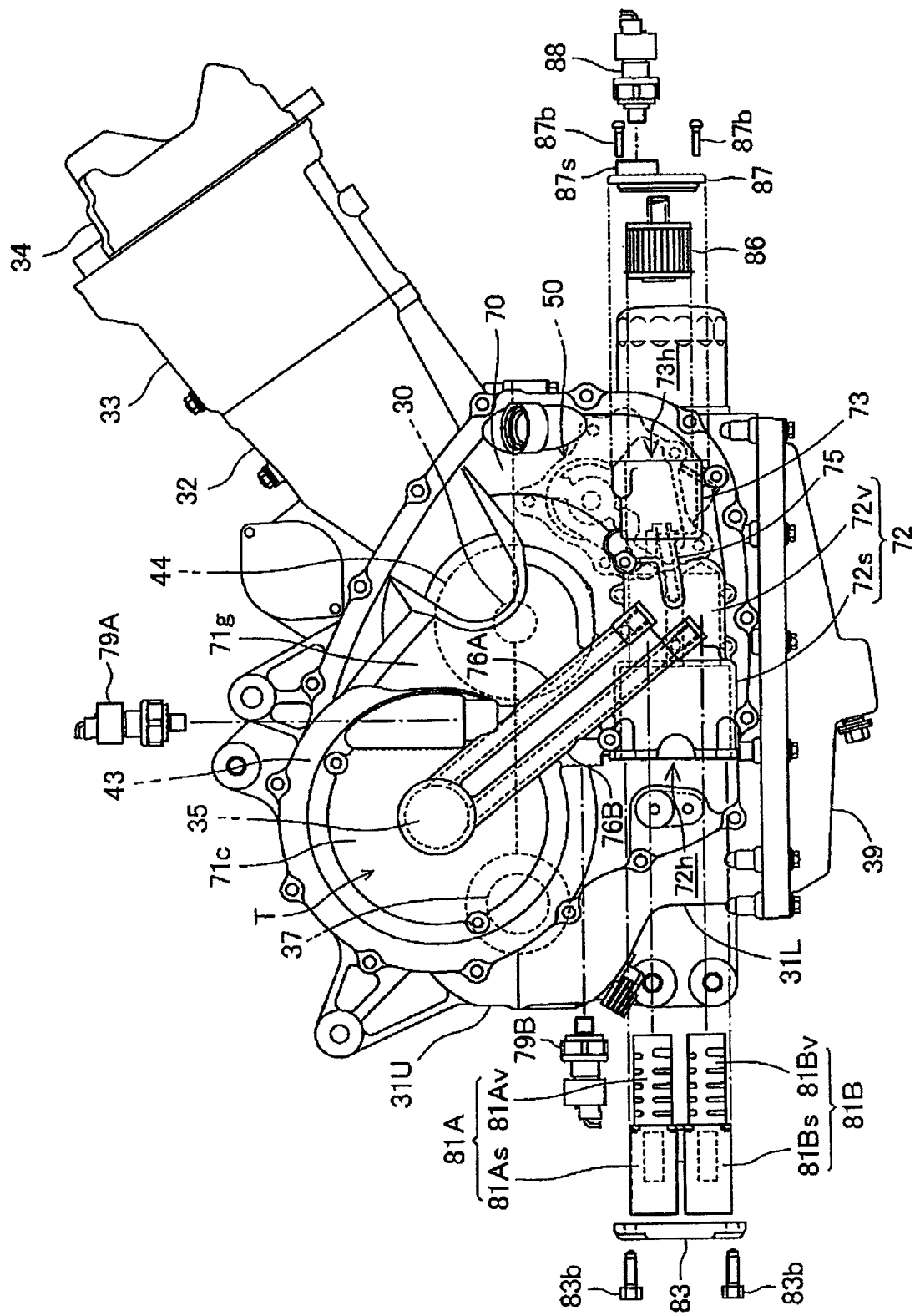
FIG. 5 is an exploded right side view of a major part of the internal combustion engine.
Figure 6:
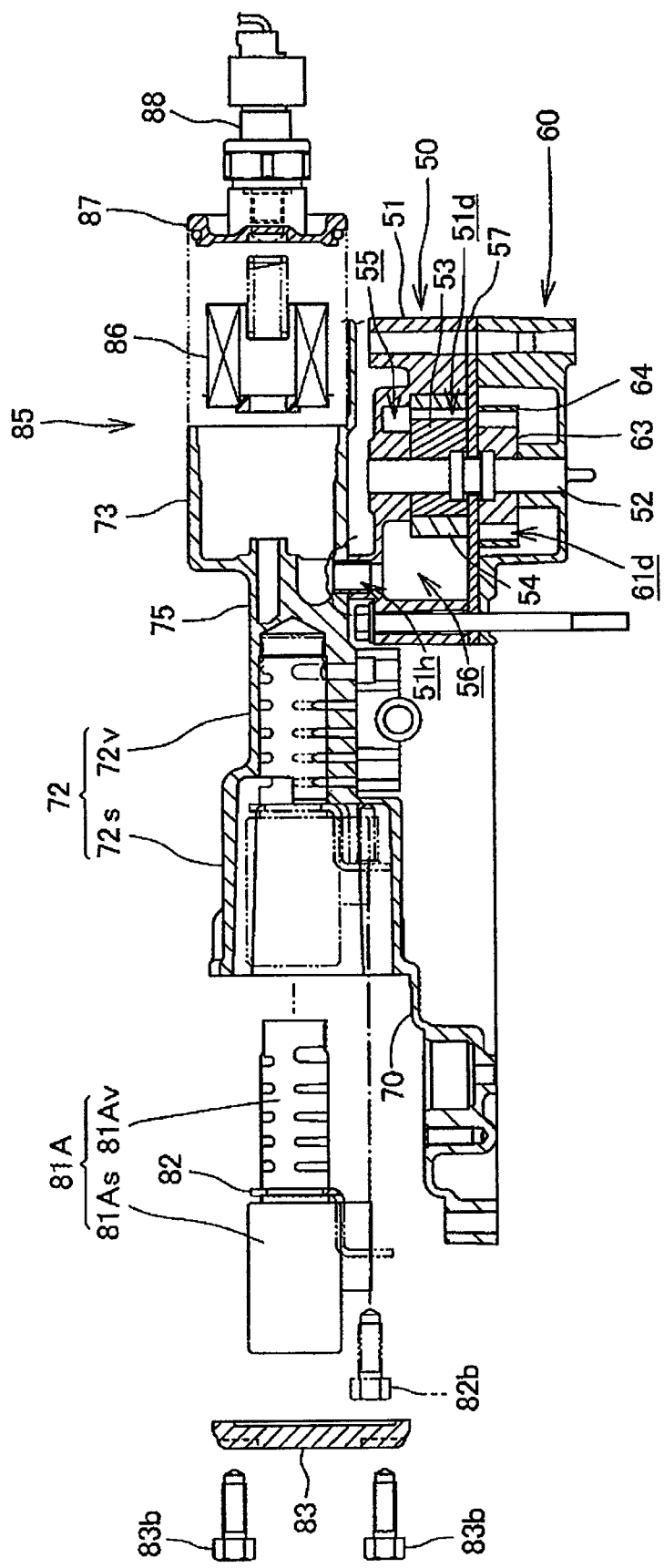
FIG. 6 is an exploded sectional view of the major part.

Referring to FIGS. 5 and 6, the first and second clutch actuators 81A and 81B are inserted as one body via the clutch actuator mounting/dismounting port 72h into the clutch actuator containing part 72, in the condition where those base parts of the valve element drive parts 81Av and 81Bv which are connected to the solenoids 81As and 81Bs are supported by a support plate 82. In the inside of the clutch actuator containing part 72, the support plate 82 is anchored by a bolt 82b (see FIG. 4). The clutch actuator mounting/dismounting port 72h is closed with a rectangular plate-shaped clutch actuator cover member 83 (see FIGS. 12 and 13), and four corners of the clutch actuator cover member 83 are screwed by bolts 83*b*.

In addition, the right case cover 70 has a structure in which an oil filter housing 73 of an oil filter 85 is formed to project from a side wall, on the front side of the clutch actuator containing part 72 in the space on the lower side of the bulge containing part 71. Therefore, the oil filter 85 can be provided without enlarging the internal combustion engine E in overall left-right width or overall front-rear width, and it is possible to avoid an enlargement of the size of the internal combustion engine E.

The oil filter housing 73 is not formed separately from the right case cover 70 but formed integrally with the right case cover 70, which leads to a reduction in the number of component parts and to favorable maintainability.

The oil filter housing 73 has a cylindrical shape with a center axis oriented in the front-rear direction, its rear end proximate to the valve case 72*v* of the clutch actuator containing part 72 is closed, it is formed at its front end with a filter element mounting/dismounting port 73*h* being opened toward the front side in a circular shape and exposed to the exterior (see FIG. 10), and a filter element 86 is inserted therein from the front side (see FIG. 5).

The oil filter housing 73 cylindrical in shape is formed at such a position as to overlap with the clutch actuator containing part 72 in front view shown in FIG. 10, and is restrained from projecting sideways. In addition, since the oil filter housing 73 is cylindrical in shape and therefore its corners do not project sideways, the bank angle of the vehicle body can be designed to be large.

Incidentally, as shown in FIG. 6, the oil filter housing 73 is projected toward the right side relative to the clutch actuator containing part 72, and the clutch actuator containing part 72 is formed on the inner side relative to an outside portion of the oil filter housing 73 in the vehicle body width direction (see FIGS. 9 and 10). Therefore, the oil filter housing 73 serves as a shield, by which the clutch actuators 81A and 81B can be protected against flying stones and the like coming from the front side.

The filter element mounting/dismounting port 73*h* oriented forward is closed with a circular plate-shaped filter cover member 87 (see FIGS. 14 and 15) put from the front side. The filter cover member 87 is anchored by two bolts 87*b* screwed at upper and lower positions.

Figure 17:
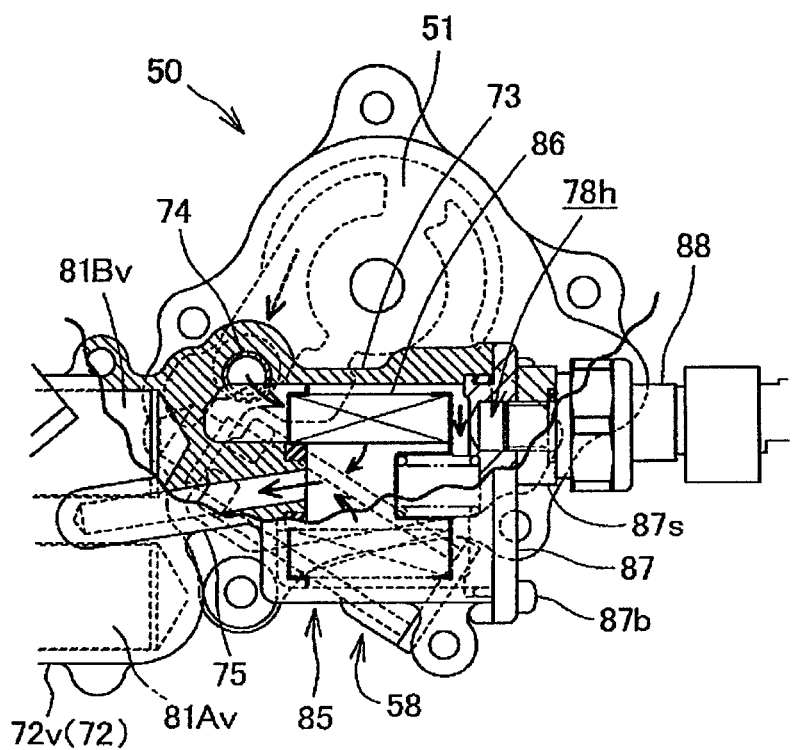
FIG. 17 is a right side view, with a major part in section, showing the condition where the right case cover is put on the control oil pump.

As shown in FIG. 17, the oil filter housing 73 is located at such a position as to cover a lower portion of the control oil pump case 51 from the right side. A circular hole communicating with the inside of the oil filter housing 73 is formed to face the discharge port 51*h* of the control oil pump case 51, both of them are interconnected by a connection pipe 74 (see FIG. 4), and the oil discharged from the control oil pump 50 is led through the discharge oil passage 56 and the connection pipe 74 to the upstream side of the filter in the oil filter housing 73.

A connection oil pipe 75 is formed between the center of a rear wall of the oil filter housing 73 and the valve case 72*v* constituting a front half of the clutch actuator containing part 72. The connection oil pipe 75 communicates with the downstream side of the filter in the center of the filter element 86.

Therefore, the oil filtered by the filter element 86 of the oil filter 85 is supplied through the connection oil pipe 75 into the valve case 72*v*.

Figure 14:
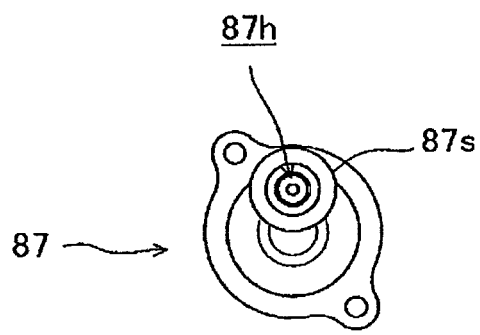
FIG. 14 is an outside view of a filter cover member.
Figure 15:
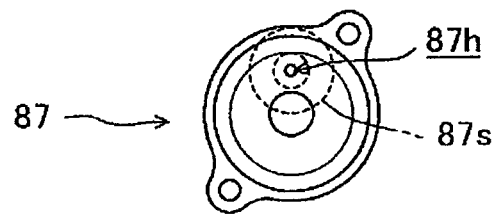
FIG. 15 is an inside view of the filter cover member.

Incidentally, referring to FIGS. 14 and 15, the filter cover member 87 is provided with a mount boss part 87*s* for mounting a discharge oil pressure sensor 88, the mount boss part 87*s* being projectingly formed at an eccentric position. The mount boss part 87*s* is provided with a circular hole 87*h* in which to insert a pressure sensing part of the discharge oil pressure sensor 88, the circular hole 87*h* being bored from the face side to the back side. The tip of the circular hole 87*h* is tapered, and is then opened to the back side via a small hole.

Therefore, the oil discharged from the control oil pump 50 is led through the connection pipe 74 to the upstream side of the filter in the oil filter housing 73. Further, the discharged oil enters into the circular hole 87*h* in the filter cover member 87, to reach the pressure sensing part of the discharge oil pressure sensor 88, so that the discharge oil pressure sensor 88 detects the pressure of the oil discharged from the control oil pump 50.

The oil supplied from the oil filter 85 into the valve case 72*v* of the clutch actuator containing part 72 is distributed to the respective valve element driving parts 81Av and 81Bv of the first and second clutch actuators 81A and 81B. Then, the working oils controlled by the valve element driving parts 81Av and 81Bv driven by the linear solenoids 81As and 81Bs respectively are served to drive control of the first and second friction clutches 41A and 41B of the twin clutch 41.

Therefore, the right case cover 70 is provided with a pair of mutually parallel, first and second control oil passages 76A and 76B which offer rectilinear connection between the valve case 72*v* of the clutch actuator containing part 72 and a central portion of the clutch containing part 71*c* containing the twin clutch 41 therein; the first and second control oil passages 76A and 76B are formed to expand in tubular shape on the surface of the right case cover 70.

The valve case 72*v* of the clutch actuator containing part 72 is located on a front lower side of the clutch containing part 71*c* located at an upper portion of the rear half of the right case cover 70. Accordingly, the first and second control oil passages 76A and 76B extend rearwardly upward from the valve case 72*v*.

The center of the clutch containing part 71*c* supports a portion near the right end of the crankshaft 35 through a bearing 77, together with the clutch inner of the first friction clutch 41A. In addition, a bottomed cylinder part 71*cc* covering the right end of the crankshaft 35 is formed to bulge to the right side. The first and second control oil passages 76A and 76B are connected to the bottomed cylinder part 71*cc*, and communicate with the inside of the latter.

A partition member 78 is interposed between an inner peripheral surface of the bottomed cylinder part 71*cc* and an outer peripheral surface of the right end of the crankshaft 35.

The partition member 78 is provided, at both ends of its cylindrical portion fitted to the right end of the crankshaft 35, with flange parts having an outside diameter equal to the inside diameter of the bottomed cylinder part 71*cc*. The inside of an outer peripheral groove between both the flange parts is divided into two spaces.

The outer peripheral groove on one side, which communicates with the first control oil passage 76A as the upper-side one of the pair of first and second control oil passages 76A and 76B oriented slantly, penetrates the cylindrical portion of the partition member 78 and the right end of the crankshaft 35, to communicate with the in-shaft oil passage 49*a*. The outer peripheral groove on the other side, which communicates with the second control oil passage 76B on the lower side, penetrates the outer-side (right-side) flange part of the partition member 78, and extends around along a bottom surface of the bottomed cylinder part 71*cc*, to communicate with the in-shaft oil passage 49*b*.

Therefore, the working oil controlled by driving of the first clutch actuator 81A is supplied through the first control oil passage 76A and the in-shaft oil passage 49*a* to the first friction clutch 41A, to effect engagement/disengagement of the first friction clutch 41A. The working oil controlled by driving of the second clutch actuator 81B is supplied through the second control oil passage 76B and the in-shaft oil passage 49B, to effect engagement/disengagement of the second friction clutch 41B.

With the first and second clutch actuators 81A and 81B controlled in a coordinated manner, drivings of the first and second friction clutches 41A and 41B are mutually controlled in timing, whereby shifting of the transmission T is carried out smoothly.

As above-mentioned, an upper half portion of the right case cover 70 is bulged to the right side to form the bulge containing part 71, and the clutch actuator containing part 72 is projectingly formed on the front lower side of the clutch containing part 71c further bulged from a rear half portion of the bulge containing part 71. Therefore, on the lower side of the clutch containing part 71c and on the rear side of the clutch actuator containing part 72, a recessed space S is formed which is opened on the three sides, namely, the rear side, the lower side and the right side.

The first and second control oil passages 76A and 76B are formed in the state of being oriented slantly while interconnecting the bottomed cylinder part 71cc at the center of the clutch containing part 71c with the valve case 72v as the front portion of the clutch actuator containing part 72, and, therefore, they do not interfere with the recessed space S. Accordingly, the recessed space S is largely opened on the right side.

Incidentally, the slantly oriented first control oil passage 76A on the upper side, of the right case cover 70, is provided at a substantially central position thereof with a sensor mounting boss part 76Ab having a mounting port directed upward. The second control oil passage 76B on the lower side is provided with a sensor mounting boss part 76Bb having a mounting port directed rearward, between the clutch containing part 71c and the clutch actuator containing part 72.

A first control oil pressure sensor 79A is mounted to the sensor mounting boss part 76Ab of the first control oil passage 76A on the upper side, in the state of being oriented in the vertical direction and projecting upward; on the other hand, a second control oil pressure sensor 79B is mounted to the sensor mounting boss part 76Bb of the second control oil passage 76B on the lower side, in the state of being oriented in the front-rear direction and projecting rearward (see FIG. 5).

The first control oil pressure sensor 79A detects the oil pressure in the first control oil passage 76A for effecting engagement/disengagement of the first friction clutch 41A, and the second control oil pressure sensor 79B detects the oil pressure in the second control oil passage 76B for effecting engagement/disengagement of the second friction clutch 41B. The oil pressures thus detected are served for enhancing the shift control properties of the twin clutch 41.

As shown in FIG. 2, the first control oil pressure sensor 79A mounted to the first control oil passage 76A in the state of being oriented in the vertical direction and the second control oil pressure sensor 79B mounted to the second control oil passage 76B in the state of being oriented in the front-rear direction are both located at a peripheral edge portion of the bulged clutch containing part 71c of the right case cover 70, and can be provided in a compact form at such positions that they do not interfere with the twin clutch 41 and that their projection to a lateral side is minimized.

In this embodiment, as shown in FIG. 10, the first control oil pressure sensor 79A (indicated by two-dotted chain line in FIG. 10) is disposed compactly on the inner side (the left side of the vehicle body) relative to the bottomed cylinder part 71cc bulged at the center of the clutch containing part 71c of the right case cover 70.

Similarly, as shown in FIG. 9, the second control oil pressure sensor 79B (indicated by two-dotted chain line in FIG. 9) is disposed compactly on the inner side relative to the bottomed cylinder part 71cc at the center of the clutch containing part 71c.

The right case cover 70 in this internal combustion engine E is integrally provided with the clutch actuator containing part 72 in which to contain the first and second clutch actuators 81A and 81B for effecting engagement/disengagement of the twin clutch 41, the clutch actuator containing part 72 being projected sideways. In addition, the clutch actuator mounting/dismounting port 72h of the clutch actuator containing part 72 is formed to be exposed to the exterior. Therefore, the first and second clutch actuators 81A and 81B contained in the clutch actuator containing part 72 can be put in and out through the clutch actuator mounting/dismounting port 72h, without need to dismount the right case cover 70. Consequently, maintainability is extremely good.

Besides, in this structure, the clutch actuator containing part 72 formed to project to a lateral side of the right case cover 70 has the clutch actuator mounting/dismounting port 72h formed to be exposed to the exterior; therefore, the clutch actuator mounting structure is simplified.

The right case cover 70 is provided with the bulge containing part 71 which has an upper half portion composed generally of the clutch containing part 71c and a gear containing part 71g and which is bulged sideways. Besides, the clutch actuator containing part 72 is projectingly formed by utilizing the space on the lower side of the bulge containing part 71. Therefore, as shown in FIG. 9, the clutch actuator containing part 72 is restrained from projecting sideways, and is compactly disposed on the inner side (the left side of the vehicle body) relative to the bottomed cylinder part 71cc bulged at the center of the clutch containing part 71c of the right case cover 70. In addition, as shown in FIGS. 2 and 5, notwithstanding the longitudinal direction of the clutch actuator containing part 72 being oriented in the front-rear direction, the clutch actuator containing part 72 is contained within the front-rear width of the bulged containing part 71 on the upper side.

Accordingly, the clutch actuator containing part 72 can be formed without enlarging the internal combustion engine E in overall left-right width or overall front-rear width, so that it is possible to avoid an enlargement of the size of the internal combustion engine E.

In addition, the oil filter housing 73 is formed on the front side of the clutch actuator containing part 72, in such a shape that the cylinder center axis of the cylindrical filter element 86 is oriented in the front-rear direction and that the filter element mounting/dismounting port 73h is directed forward. The clutch actuator containing part 72 is formed with the clutch actuator mounting/dismounting port 72h directed rearward. Therefore, notwithstanding the clutch actuator containing part 72 and the oil filter housing 73 being disposed proximate to each other, the first and second clutch actuators 81A and 81B and the filter element 86 can be mounted and dismounted without interference with each other (see FIG. 5). Therefore, while good maintainability is secured, the first and second clutch actuators 81A and 81B and the oil filter 85 juxtaposed in the front-rear direction can be kept small in the front-rear width, and an enlargement of the size of the internal combustion engine E can be avoided.

As shown in FIG. 2, the clutch actuator containing part 72 is formed at such a vertical position that its lower end is proximate to or in contact with the lower end edge of the right case cover 70. Therefore, the clutch actuator containing part 72 can be disposed as low as possible, whereby lowering of the center of gravity can be contrived. In addition, the oil filter 85 is so formed that its upper end is located at substantially the same vertical position as the upper end of the clutch actuator containing part 72. This ensures that the space on the upper side of the clutch actuator containing part 72 and the oil filter 85 having their upper ends at substantially the same vertical position is effectively utilized for the twin clutch 41, the pair of the primary drive gear 44 and the primary driven gear 43, and the like.

The first and second clutch actuators 81A and 81B are provided on the front lower side of the twin clutch 41. The pair of first and second control oil passages 76A and 76B for supplying the working oil from the first and second clutch actuators 81A and 81B to the respectively corresponding first and second friction clutches 41A and 41B are formed at the outside surface of the right case cover 70 in the state of being oriented obliquely and extending rectilinearly in parallel to each other. Accordingly, the right case cover 70 is provided with the recessed space S on the rear side of the first and second clutch actuators 81A and 81B and on the lower side of the twin clutch 41, where the first and second control oil passages 76A and 76B do not interfere. The recessed space S is opened on the rear side, the lower side and the outer side, to form a space suitable for mounting the driver's foot.

As shown in FIGS. 1 and 2, when the driver seated on the tandem-type seat 17 put his or her foot Pf on the foot step 21, the tip of the foot Pf is contained within the recessed space S.

Incidentally, the second control oil pressure sensor 79B mounted to the second control oil passage 76B is disposed at a lower portion of the peripheral edge of the clutch containing part 71c in the state of being oriented in the front-rear direction. Therefore, the second control oil pressure sensor 79B does not interfere with the recessed space S and, therefore, does not obstruct the disposition of the tip of the foot Pf within the recessed space S.

Accordingly, the foot Pf of the driver P can be set in an optimum position, without needlessly protruding to the right outer side.

The oil discharged from the control oil pump 50 is led into the oil filter housing 73 of the oil filter 85. The discharge oil pressure sensor 88 for detecting the pressure of the discharged oil is forwardly projectingly provided while being mounted to the housing cover member 87 for closing the filter element mounting/dismounting port 73h directed forward of the oil filter housing 73. Therefore, the discharge oil pressure sensor 88 can be provided utilizing the space on the front side of the oil filter 85, and its projection from the internal combustion engine E is avoided as securely as possible. In addition, with the discharge oil pressure sensor 88 preliminarily mounted to the housing cover member 87 so that they can be handled as one body, workability can be enhanced.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A clutch actuator mounting structure for an internal combustion engine, comprising:
    an engine case including a clutch actuator containing part adapted to house a clutch actuator for engaging/disengaging a shift clutch, said clutch actuator containing part having a clutch actuator mounting/dismounting port which is exposed to an exterior of said engine case,
    wherein the clutch actuator is configured to be mounted and dismounted through said clutch actuator mounting/dismounting port.
    wherein said engine case is mountable on a lateral side of a crankcase which rotatably supports a crankshaft thereon;
    wherein said clutch actuator containing part projects to a lateral side of said engine case,
    wherein the internal combustion engine is mountable on a vehicle with the crankshaft oriented in a left-right direction;
    wherein the shift clutch is provided at an end of a transmission main shaft which projects into an inside of the engine case, said transmission main shaft being provided inside the crankcase;
    wherein said engine case further comprises a bulge containing part in which the shift clutch and a gear pair for transmitting power from the crankshaft to the shift clutch are mounted, the bulge containing part being bulged to the lateral side of said engine case; and
    wherein said clutch actuator containing part projects into a space on a lower side of said bulge containing part.

2. The clutch actuator mounting structure according to claim 1, wherein said engine case is configured to be provided with an oil filter so as to overlap, in front view, with a front side of said clutch actuator containing part, in the space on the lower side of said bulge containing part.

3. The clutch actuator mounting structure according to claim 2, wherein said engine case further comprises an oil filter housing.

4. The clutch actuator mounting structure according to claim 3, wherein said clutch actuator containing part is formed inward of said oil filter housing, in a vehicle body width direction.

5. The clutch actuator mounting structure according to claim 4,
    wherein a longitudinal direction of said clutch actuator containing part is oriented in a vehicle front-rear direction; and
    wherein said oil filter housing is formed such that a cylindrical filter element of the oil filter contained in said oil filter housing has a center axis oriented in the vehicle front-rear direction.

6. The clutch actuator mounting structure according to claim 5,
    wherein said clutch actuator mounting/dismounting port of said clutch actuator containing part faces rearward in the vehicle front-rear direction; and
    wherein a filter element mounting/dismounting port of said oil filter housing faces forward in the vehicle front-rear direction.

7. The clutch actuator mounting structure according to claim 6,
    wherein a lower end of said clutch actuator containing part is proximate to or overlapping with a lower end edge of said engine case; and
    wherein an upper end of said oil filter housing is located substantially at the same vertical position as an upper end of said clutch actuator containing part.

8. The clutch actuator mounting structure according to claim 7,
    wherein the shift clutch is a twin clutch and a pair of clutch actuators;

wherein the pair of clutch actuators for respectively driving clutches of the twin clutch by oil pressure are disposed on a front lower side of the twin clutch;

wherein a pair of control oil passages are formed at an outside surface of said engine case, the pair of control oil passages being oblique to the center axis of the cylindrical filter element of the oil filter contained in said oil filter housing, said pair of control oil passages extending rectilinearly in parallel to each other; and wherein said pair of control oil passages supply a working oil from the clutch actuators to the corresponding shift clutches.

9. The clutch actuator mounting structure according to claim 8, further comprising:

a first control oil pressure sensor projecting upwardly at a substantially central position of an upper-side one of said pair of control oil passages; and a second control oil pressure sensor projecting rearwardly in lower-side one of said pair of control oil passages, at a height position between the shift clutch and the pair of clutch actuators.

10. The clutch actuator mounting structure according to claim 9, further comprising:

a discharge oil pressure sensor for detecting the oil pressure of oil discharged from an oil pump and led into the oil filter, said discharge oil pressure sensor projecting forwardly on the oil filter.

11. The clutch actuator mounting structure according to claim 10, wherein the discharge oil pressure sensor is mounted to a filter cover member which closes the filter element mounting/dismounting port, said filter cover member being disposed forward of the oil filter housing of the oil filter, in the vehicle front-rear direction.

* * * * *